No. 639,108. Patented Dec. 12, 1899.
J. A. STÄCKIG & O. CARLSON.
WEIGHING APPARATUS.
(Application filed Jan. 20, 1899.)
(No Model.)
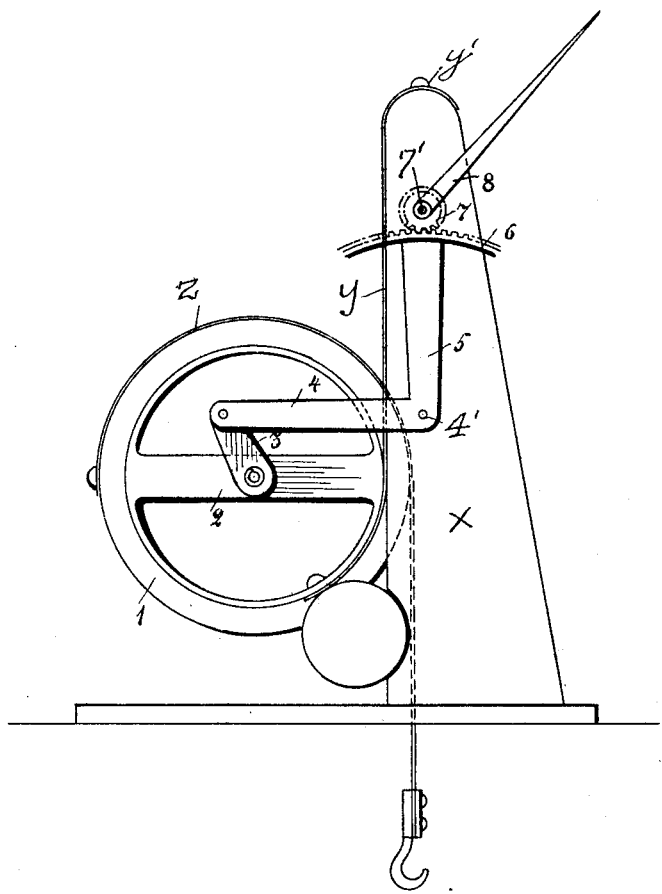
Inventors
Johan A. Stäckig
Otto Carlson

UNITED STATES PATENT OFFICE.

JOHAN AUGUST STÄCKIG AND OTTO CARLSON, OF STOCKHOLM, SWEDEN.

WEIGHING APPARATUS.

SPECIFICATION forming part of Letters Patent No. 639,108, dated December 12, 1899.

Application filed January 20, 1899. Serial No. 702,357. (No model.)

*To all whom it may concern:*

Be it known that we, JOHAN AUGUST STÄCKIG and OTTO CARLSON, of Stockholm, Sweden, have invented certain new and useful Improvements in Weighing Apparatus, of which the following is a full, clear, and exact specification.

In weighing apparatus of the kind wherein the weight or load is suspended from a band placed around a counterweighted rolling cylinder it is of great importance to obtain a uniform movement of the pointer when the load is increased and also to be able to regulate this movement according to circumstances. These results are obtained by means of the apparatus illustrated in the accompanying drawing and hereinafter described.

To a rib 2 in the rolling cylinder 1 is fixed a pin carrying a movable link 3, the free end of which is movably connected with one arm 4 of a lever 4 5, having its fulcrum arranged on the frame of the weighing apparatus. This link 3 is loosely mounted on a pin at the center of the rolling cylinder 1. The lever 4 5 carries a toothed segment 6, engaging with a pinion 7, to which a pointer 8 is attached. It is evident that by the movement of the rolling cylinder 1 the lever 3 will turn the link 4 5 upon its fulcrum, and thus transmit the movement of the said cylinder 1 to the pointer 8 by means of the segment 6 and pinion 7. As will be seen from the drawing, the movement of the pointer may be regulated by means of the above-described lever arrangement. In the beginning and by small increases of the load the movement of the rolling cylinder is only a small one; but by selecting suitable proportions of the various levers the distance through which the pointer moves may be increased. On the other hand, toward the end when small increases of the load will bring about comparatively large movements of the rolling cylinder the distance moved by the pointer may be made considerably smaller. It is obvious that by altering the length and point of suspension of the lever 3, as also the dimensions of the lever 4 5, one may obtain all kinds of movements of the pointer—such, for instance, as through an absolutely uniform distance proportionate with the increase of the load.

Instead of the toothed segment 6 and pinion 7 other suitable means for transmitting the movement of the lever 4 5 to the pointer 8 may be employed—such, for instance, as friction-rollers, a cord-pulley with a cord attached to a segment, or the like. The same result may also be obtained by attaching the pointer direct to the lever-arm 5, whereby the said pointer will move together with the said arm, although its movement to both sides will then be limited to a certain extent.

The rolling cylinder 1 is connected with the post $x$ by a strap $y$ while the load is suspended from the rolling cylinder by the strap Z. The lever 4 5 is pivoted to the post, and the pinion and pointer are also supported on the post. The strap $y$ is attached to the post at the point $y'$, the lever 4 5 is pivoted to the side of the post at point $4'$, and the pinion 7 of the pointer turns around the pin $7'$, projecting from the side of the post.

Having now particularly described and ascertained the nature of our said invention and in what manner the same is to be performed, we declare that what we claim is—

1. In combination, the rolling cylinder with the straps $y$ and $z$, the link 3 connected with the rolling cylinder loosely, the indicator and the connections between the link and the indicator, substantially as described.

2. In combination, the post, the rolling cylinder, the straps $y$, $z$, connected to the cylinder, the link 3 connected loosely to the center of the cylinder, the indicator and the lever 4, 5, between the link and the indicator, substantially as described.

In witness whereof we have hereunto set our hands in the presence of two witnesses.

JOHAN AUGUST STÄCKIG.
OTTO CARLSON.

Witnesses:
HUGO PALMQUIST,
J. NILSSON.